(12) United States Patent  (10) Patent No.: US 8,927,169 B2
Yumiya                    (45) Date of Patent: Jan. 6, 2015

(54) FUEL CELL SYSTEM AND MOBILE BODY (75) Inventor: Hiroyuki Yumiya, Nagoya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 856 days.

(21) Appl. No.: 12/532,367

(22) PCT Filed: Mar. 18, 2008

(86) PCT No.: PCT/JP2008/055612
§ 371 (c)(1),
(2), (4) Date: Sep. 21, 2009

(87) PCT Pub. No.: WO2008/126668
PCT Pub. Date: Oct. 23, 2008

(65) Prior Publication Data
US 2010/0119901 A1   May 13, 2010

(30) Foreign Application Priority Data
Mar. 22, 2007 (JP) ................................. 2007-074216

(51) Int. Cl.
H01M 8/04    (2006.01)
B60L 11/18   (2006.01)
H01M 8/06    (2006.01)

(52) U.S. Cl.
CPC ......... *B60L 11/1881* (2013.01); *B60L 11/1892* (2013.01); *B60L 11/1894* (2013.01); *H01M 8/04253* (2013.01); *H01M 8/04358* (2013.01); *H01M 8/04365* (2013.01); *H01M 8/04425* (2013.01); *H01M 8/04738* (2013.01); *H01M 8/0687* (2013.01); H01M 8/04007 (2013.01); H01M 2250/20 (2013.01); Y02T 90/34 (2013.01); Y02E 60/50 (2013.01); Y02T 90/32 (2013.01)
USPC .......... 429/433; 429/428; 429/429; 429/434; 429/436; 429/442

(58) Field of Classification Search
None
See application file for complete search history.

(56) References Cited

U.S. PATENT DOCUMENTS

| 3,703,807 | A | * | 11/1972 | Rice ........................... 60/39.182 |
| 4,702,753 | A | * | 10/1987 | Kowalczyk ................... 96/117.5 |
| 6,635,374 | B1 | * | 10/2003 | Aramaki ....................... 429/413 |
| 7,396,604 | B2 | * | 7/2008 | Rainville ...................... 429/444 |
| 2002/0022161 | A1 | * | 2/2002 | Kurosaki et al. ................ 429/13 |

(Continued)

FOREIGN PATENT DOCUMENTS

| JP | 56121825 | * | 9/1981 |
| JP | 61-21868 U | | 2/1986 |

(Continued)

OTHER PUBLICATIONS

Fuel Cell Systems; Module 5; Hydrogen Fuel Cell Engines and Related Technologies: Rev 0, Dec. 2001; College of the Desert, 32 pages.*

*Primary Examiner* — Jeffrey Wollschlager
(74) *Attorney, Agent, or Firm* — Kenyon & Kenyon LLP (57) ABSTRACT

An object of the present invention is to provide a fuel cell system and a mobile body capable of restraining freeze in an air cleaner. The fuel cell system includes an air cleaner for cleaning the air to be supplied to a fuel cell and a heater for heating the air cleaner. The air cleaner can be alternatively heated by supplying a refrigerant in a refrigerant piping system to the air cleaner instead of using the heater.

10 Claims, 6 Drawing Sheets

(56) References Cited

U.S. PATENT DOCUMENTS

| | | | |
|---|---|---|---|
| 2002/0039672 A1* | 4/2002 | Aramaki | 429/22 |
| 2005/0095474 A1* | 5/2005 | Rainville | 429/22 |
| 2006/0035120 A1* | 2/2006 | Sakai | 429/22 |
| 2007/0026280 A1* | 2/2007 | Uehara et al. | 429/25 |
| 2008/0091629 A1* | 4/2008 | Matsumoto et al. | 706/14 |
| 2009/0098426 A1* | 4/2009 | Tsuchiya et al. | 429/23 |

FOREIGN PATENT DOCUMENTS

| | | | |
|---|---|---|---|
| JP | 61-106967 A | | 5/1986 |
| JP | 61-128375 U | | 8/1986 |
| JP | 63-60069 U | | 4/1988 |
| JP | 03077616 | * | 4/1991 |
| JP | 2001-70736 A | | 3/2001 |
| JP | 2004-182220 A | | 7/2004 |
| JP | 2005-129494 A | | 5/2005 |
| JP | 2005-135738 A | | 5/2005 |
| JP | 2005-536011 A | | 11/2005 |
| JP | 2006-59673 A | | 3/2006 |
| JP | WO2006057124 | * | 6/2006 |
| JP | 2006-286439 A | | 10/2006 |
| JP | 2007-12388 A | | 1/2007 |
| WO | WO2007117015 | * | 10/2007 |

\* cited by examiner

FUEL CELL SYSTEM AND MOBILE BODY

This is a 371 national phase application of PCT/JP2008/055612 filed 18 Mar. 2008, which claims priority to Japanese Patent Application No. 2007-074216 filed 22 Mar. 2007, the contents of which are incorporated herein by reference.

TECHNICAL FIELD

The present invention relates to a fuel cell system including an air cleaner and a mobile body including the fuel cell system.

BACKGROUND ART

Hitherto, there has been known a fuel cell vehicle provided with a fuel cell system (e.g., Japanese Patent Application Laid-Open No. 2004-182220). The fuel cell vehicle takes external air in by a pump through an air cleaner and pressure-feeds the intake external air as an oxidant gas to a fuel cell. The air cleaner has a case into which external air is introduced, and foreign matters are separated from the external air in the case. The external air, which has been filtered by the separation, is discharged into a supply passage outside the case and supplied to the fuel cell.

DISCLOSURE OF INVENTION

When a fuel cell vehicle travels in a snowing area, external air with snow mixed therein may be introduced into an air cleaner. The introduced snow is separated, as with foreign matters, in the case; however, the separated snow occasionally accumulates in the case and remains incompletely melted. Further, in an environment at a freezing point temperature, the moisture which has been separated or which has accumulated in the case occasionally condenses and freezes in the case. If the snow accumulates or moisture freezes, then there is a possibility that a flow path or a filter in the case becomes clogged. As a result, a pump is not able to supply a sufficient flow rate of an oxidizing gas to a fuel cell, possibly causing an output of the fuel cell to fail to satisfy a required driving force of a traction motor.

Japanese Patent Application Laid-Open No. 2004-182220 discusses nothing about the problem mentioned above, leaving room for improvement.

An object of the present invention is to provide a fuel cell system and a mobile body capable of restraining an air cleaner from freezing.

To attain the object, a fuel cell system in accordance with the present invention comprises a fuel cell; an air cleaner which cleans air supplied to the fuel cell; and heating means which heats the air cleaner.

With this arrangement, even if, for example, snow is introduced into the air cleaner, the snow can be melted by heating the snow. This makes it possible to restrain the air cleaner from freezing even at a low temperature, such as the freezing point. Further, the freeze restraint makes it possible to restrain an obstacle from arising in an air flow in the air cleaner, thus securing a flow rate of air to the fuel cell.

Preferably, the heating means is formed of a heater provided with the air cleaner.

This arrangement allows the air cleaner to be heated by a simple construction.

Further preferably, the air cleaner includes a case having an air inlet and an air outlet, and a filter disposed in the case between the air inlet and the air outlet. The heater is provided on an outer surface side of the case.

With this arrangement, an existing air cleaner can be utilized and the temperature of the interior of the case can be raised.

In another preferable mode, the fuel cell system includes a cooling system which circulates a refrigerant to constituent equipment of the fuel cell system. The heating means is constituted by a part of the cooling system which supplies a refrigerant, which has passed through the constituent equipment, to the air cleaner.

With this arrangement, the temperature of the air cleaner can be raised by the exhaust heat of the refrigerant which has passed through the constituent equipment of the fuel cell system. Thus, the exhaust heat of the constituent equipment of the fuel cell system can be effectively used, obviating the need for separately providing a heat source, such as a heater.

Preferably, the aforesaid constituent equipment is a fuel cell.

Thus, the temperature of the air cleaner can be raised by using the exhaust heat of the fuel cell which generates heat from an electrochemical reaction.

Further preferably, the air cleaner includes a case having an air inlet and air outlet and a filter disposed in the case at between the air inlet and the air outlet. A flow path, which configures a part of the cooling system constituting the heating means, is formed in the case.

Preferably, the fuel cell system includes a temperature sensor which detects the temperature of external air and a controller which controls the amount of heating of the air cleaner by the heating means on the basis of a detection result of the temperature sensor.

With this arrangement, the air cleaner is not wastefully heated when, for example, the temperature of external air does not cause the air cleaner to freeze. Meanwhile, when the temperature of external air is one that may cause the air cleaner to freeze, e.g., when the temperature of external air is the freezing point, or when snow is mixed in air, then the air cleaner can be heated. This makes it possible to restrain the air cleaner from freezing while restraining the consumption of thermal energy at the same time.

According to another preferred mode, the fuel cell system further includes a compressor which takes air in through the intermediary of the air cleaner and pressure-feeds the air to the fuel cell, and a controller which controls the amount of heating of the air cleaner by the heating means on the basis of at least one of the intake amount of air to the air cleaner and the temperature of the intake air, and the pressure-feed amount and the pressure-feed temperature of the air from the air cleaner.

With this arrangement, if, for example, the intake amount or the pressure-feed amount of air decreases, then the freeze of the air cleaner, which is considered to have caused the decrease, can be promptly solved by heating. Further, for example, also if the intake temperature or the pressure-feed temperature close to an external air temperature is the freezing point, the air cleaner can be heated. Thus, the freeze of the air cleaner can be restrained while restraining the consumption of thermal energy at the same time by controlling the heating amount on the basis of at least one of the intake amount and intake temperature of air, the pressure-feed amount, and the pressure-feed temperature.

A mobile body in accordance with the present invention to fulfill the aforesaid object is provided with the fuel cell system in accordance with the present invention described above.

This arrangement restrains the air cleaner from freezing, so that even in a case where, for example, the mobile body travels in a snowing region or a cold region or in a case where the mobile body is used in a low-temperature environment, an air flow rate corresponding to a required driving force of the mobile body can be supplied to the fuel cell. Thus, the required driving force of the mobile body can be satisfied.

BEST MODE FOR CARRYING OUT THE INVENTION

The following will describe a fuel cell system and a mobile body according to a preferred embodiment of the present invention with reference to the accompanying drawings. The fuel cell system is characterized by being constructed so as to be capable of heating an air cleaner. In the following description, a vehicle will be taken as an example of a mobile body provided with the fuel cell system.

First Embodiment

Figure 1:
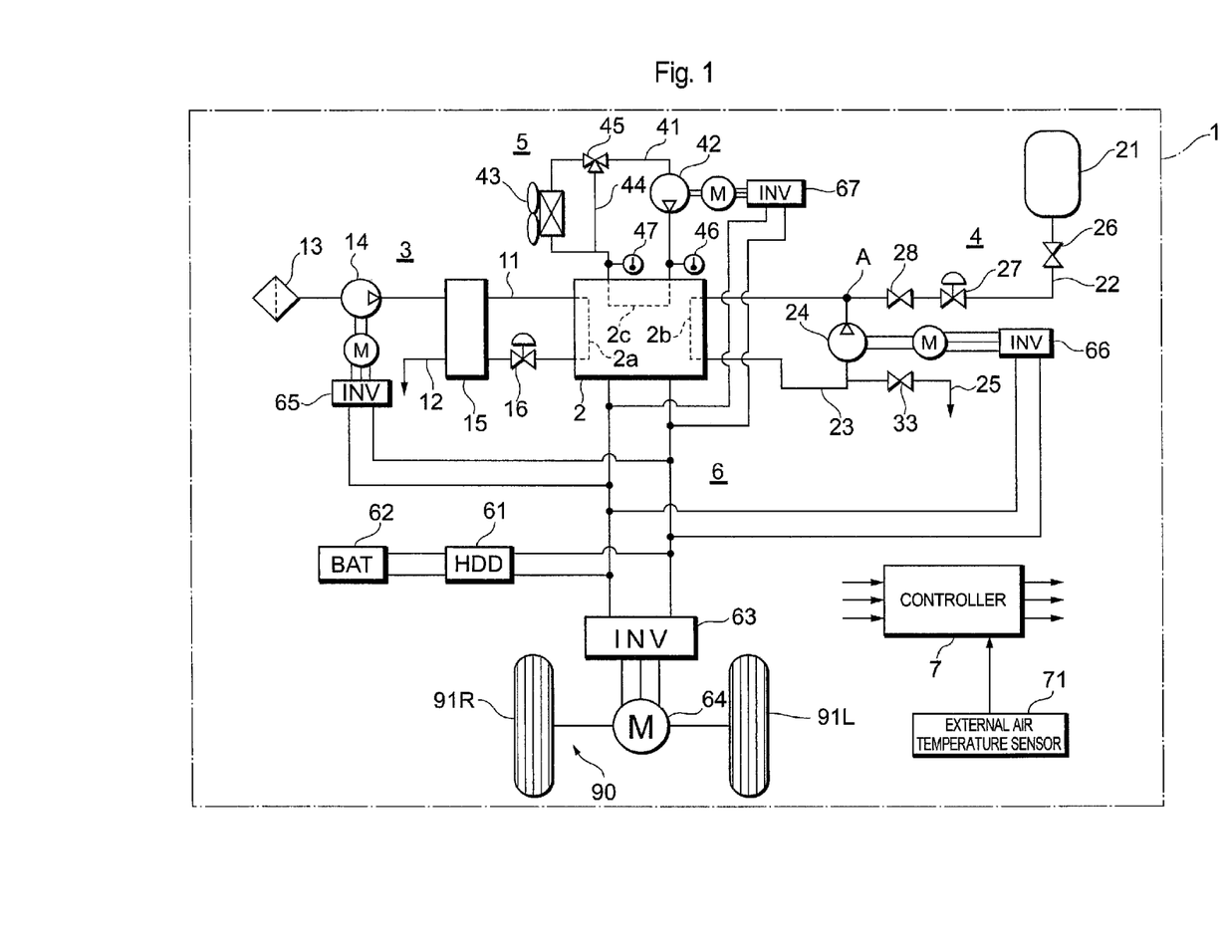
FIG. 1 is a block diagram illustrating a fuel cell system according to a first embodiment.

As illustrated in FIG. 1, a fuel cell system 1 includes a fuel cell 2, an oxidizing gas piping system 3 which supplies air (oxygen) as an oxidizing gas to the fuel cell 2, a fuel gas piping system 4 which supplies a hydrogen gas as a fuel gas to the fuel cell 2, a refrigerant piping system 5 which supplies a refrigerant to the fuel cell 2 to cool the fuel cell 2, an electric power system 6 which performs charge/discharge of the electric power of the system 1, and a controller 7 which controls the entire system 1.

The fuel cell 2 is, for example, a solid polymer electrolyte type, and has a stack structure formed by stacking multiple unit cells. A unit cell of the fuel cell 2 has an air electrode on one surface of an electrolyte membrane, a fuel electrode on the other surface thereof, and a pair of separators sandwiching the air electrode and the fuel electrode from both sides. An oxidizing gas is supplied to an oxidizing gas passage 2a in one separator, while a fuel gas is supplied to a fuel gas passage 2b in the other separator. An electrochemical reaction between the fuel gas and the oxidizing gas, which have been supplied, causes the fuel cell 2 to generate electric power. The electrochemical reaction in the fuel cell 2 is a heat-generating reaction, the temperature of the solid polymer electrolyte type fuel cell 2 ranging from about 60 to about 80° C.

The oxidizing gas piping system 3 has a supply path 11 through which the oxidizing gas to be supplied to the fuel cell 2 passes and a discharge path 12 through which an oxidizing off gas discharged from the fuel cell 2 passes. The supply path 11 is provided with a compressor 14 (compression machine) which takes in the oxidizing gas through an air cleaner 13, and a humidifier 15 which humidifies the oxidizing gas pressure-fed by the compressor 14. The oxidizing off gas passing through the discharge path 12 flows through a back-pressure regulating valve 16 and is subjected to moisture exchange in the humidifier 15 and then finally discharged as an exhaust gas into the atmosphere outside the system.

The fuel gas piping system 4 has a hydrogen supply source 21, a supply path 22 through which a hydrogen gas to be supplied to the fuel cell 2 from the hydrogen supply source 21 passes, a circulation path 23 for returning the hydrogen off gas discharged from the fuel cell 2 to a merging point A of the supply path 22, a pump 24 which pressure-feeds the hydrogen off gas in the circulation path 23 to the supply path 22, and a purge path 25 which is branched and connected to the circulation path 23. Opening a supply valve 26 causes the hydrogen gas, which has flown out into the supply path 22 from the hydrogen supply source 21, to be supplied to the fuel cell 2 via a regulator valve 27 and other pressure reducing valves, and a shutoff valve 28. The purge path 25 is provided with a purge valve 33 for discharging the hydrogen off gas to an external hydrogen diluter (not shown).

The refrigerant piping system 5 (cooling system) includes a refrigerant flow path 41, a cooling pump 42, a radiator 43, a bypass flow path 44, and a switching valve 45. The refrigerant flow path 41 is in communication with a cooling flow path 2c in the fuel cell 2. The refrigerant flow path 41 has a temperature sensor 46 provided near a refrigerant inlet of the fuel cell 2 and a temperature sensor 47 provided near a refrigerant outlet of the fuel cell 2. The refrigerant temperature detected by the temperature sensor 47 reflects the internal temperature of the fuel cell 2 (hereinafter referred to as "the temperature of the fuel cell 2"). The cooling pump 42, which is provided in the refrigerant flow path 41, circulates the refrigerant in the refrigerant flow path 41 to the fuel cell 2 by driving a motor. The radiator 43 cools the refrigerant discharged from the fuel cell 2. The bypass flow path 44 bypasses the radiator 43. The switching valve 45 sets the circulation of cooling water to the radiator 43 and the bypass flow path 44.

The electric power system 6 includes a high-voltage DC/DC converter 61, a battery 62, a traction inverter 63, a traction motor 64, and various auxiliary equipment inverters 65, 66, and 67. The high-voltage DC/DC converter 61 implements the charge/discharge of the battery 62 and also controls the output voltage of the fuel cell 2. The traction inverter 63 converts direct current into three-phase alternating current and supplies the three-phase alternating current to the traction motor 64. The traction motor 64 is a three-phase AC motor constituting a major motive power source of a vehicle 90 provided with the fuel cell system 1, and connected to wheels 91L and 91R of the vehicle 90. The auxiliary equipment inverters 65, 66 and 67 control the drive of the motors of the compressor 14, the pump 24, and the cooling pump 42, respectively.

The controller 7 is constructed as a microcomputer which includes a CPU, a ROM and a RAM therein. The CPU carries out desired operation according to a control program to conduct various types of processing or control, such as the control of a heating amount, which will be discussed later. The ROM stores a control program and control data to be handled by the CPU. The RAM is used as various work areas mainly for control processing. The controller 7 receives detection signals from various sensors, such as the pressure sensor and the temperature sensor (46, 47) used for the gas systems (3, 4) and the refrigerant system 5, an accelerator pedal opening degree sensor which detects the opening degree of the accelerator pedal of the vehicle 90, and an external air temperature sensor 71 which detects the temperature of external air. Then the controller 7 outputs control signals to constituent elements.

Figure 2:
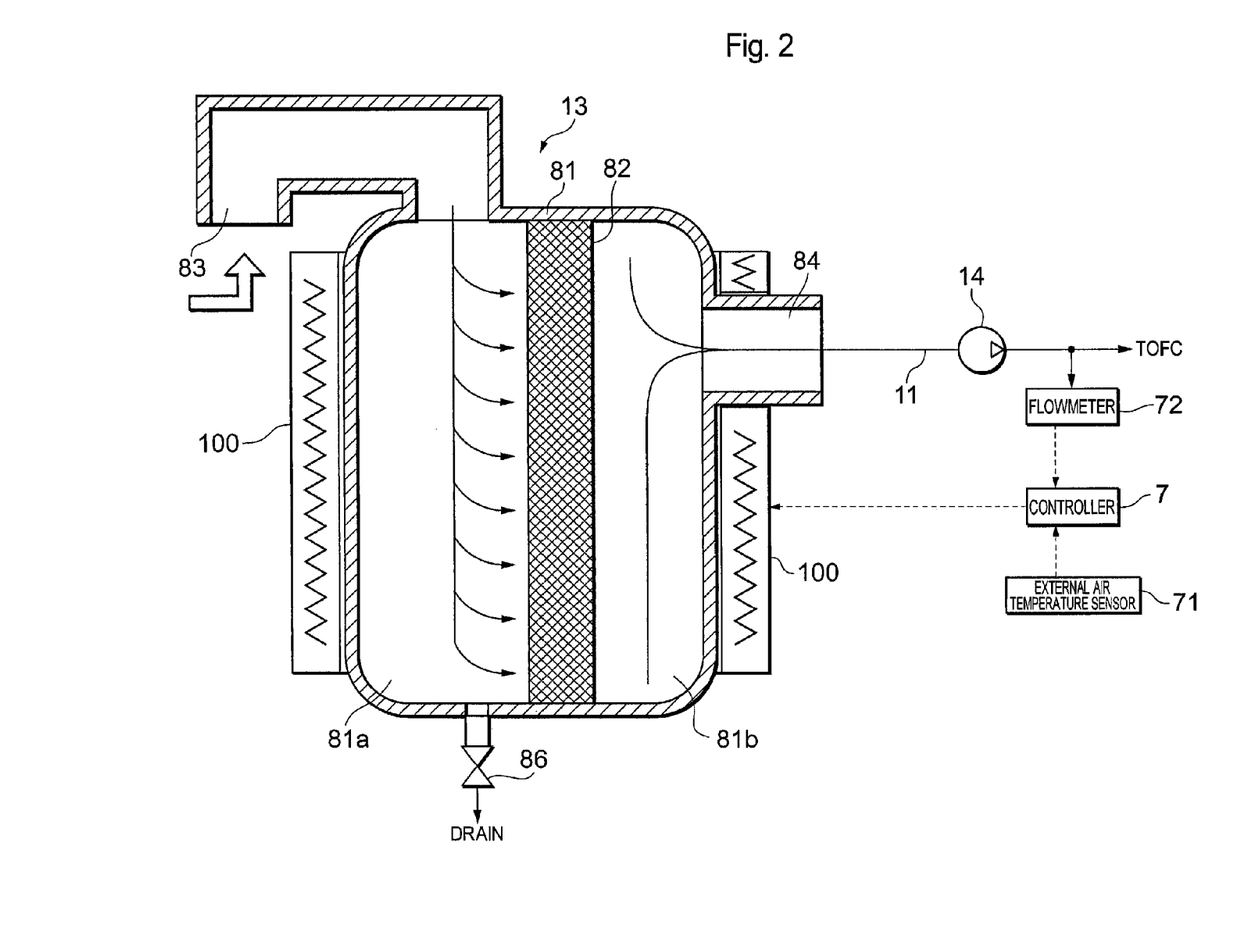
FIG. 2 is a schematic sectional diagram illustrating an air cleaner and a heater according to the first embodiment.

FIG. 2 is a sectional diagram schematically illustrating the construction of the air cleaner 13.

As illustrated in FIG. 2, the air cleaner 13 includes a boxy case 81. A paper type air filter 82, for example, which adsorbs the dust in a passing gas (air) is disposed in the case 81. The air filter 82 defines an intake space 81a and a discharge space 81b in the case 81.

In the case 81, an air inlet 83 is provided in the intake space 81a and an air outlet 84 is provided in the discharge space 81b. The air inlet 83 opens downward to the atmosphere. The air outlet 84 is connected to the supply path 11 connected to the compressor 14. A drain valve 86 is connected to a bottom portion 81c of the case 81. The position of the drain valve 86 is not particularly limited, although the position thereof is preferably in the intake space 81a, which is a space on the upstream side of the air filter 82.

In the construction described above, when the compressor 14 is driven, external air is introduced into the intake space 81a through the air inlet 83, and the external air passes through the air filter 82 in the air cleaner 13. Then, the external air, which has been cleaned by the removal of the dust during the passage, is sent to the discharge space 81b, and drawn into the compressor 14 through the air outlet 84 to be supplied to the fuel cell 2. Further, when the drain valve 86 is opened, the moisture that may have accumulated at the bottom of the case 81 is discharged to the outside.

Here, when the vehicle 90 travels in, for example, a snowing region or a cold region, or when the vehicle 90 is used in a low-temperature environment, snow may be taken together with external air into the air cleaner 13. The snow which has been taken in would be captured by the air filter 82 as with other foreign matters and remain as it is on the air filter 82, becoming a factor of blocking an air flow. Hence, according to the present embodiment, a heater 100 is provided as a heating means for heating the air cleaner 13 to restrain the air cleaner 13 from freezing.

The heater 100 is provided in contact or non-contact with an external surface of the case 81. Here, the heater 100 is provided in contact with an outer peripheral surface of the case 81. This arrangement allows the interior of the case 81 to be extensively heated, thus making it possible to quickly raise the temperature in the case 81.

However, the heater 100 is not limited as to the position or the like thereof as long as the construction thereof allows the temperature in the case 81 to rise. For example, the heater 100 may alternatively be provided inside the case 81. Further, in another mode, the heater 100 is preferably provided near the air filter 82. This position makes it possible to intensively heat the air filter 82. Thus, if the air filter 82 freezes, the air filter 82 can be promptly deiced. If the heater 100 is provided outside the case 81, then the case 81 is preferably formed of a material having a high heat transfer coefficient, considering the thermal conduction into the case 81.

The heater 100 is electrically connected to the controller 7, and the heating temperature, the heating time, the heating start timing, the heating amount and the like thereof are controlled by the controller 7. Driving the heater 100 when there is no need for heating the air cleaner 13 is undesirable, because the system efficiency would deteriorate. Hence, the heater 100 is preferably driven only when it is determined that the air cleaner 13 may freeze or has frozen. Determining whether the freeze has taken place can be accomplished by, for example, the following four methods.

A first method uses the external air temperature sensor 71. To be specific, if a detected temperature of the external air temperature sensor 71 is, for example, the freezing point (0° C.), then the controller 7 drives the heater 100 and controls the heating amount of the heater 100 so as to prevent freeze from taking place in the case 81. On the other hand, if the temperature detected by the external air temperature sensor 71 exceeds the freezing point (0° C.), then the controller 7 keeps the heater 100 turned off.

A second method uses a flowmeter 72 provided on the downstream side of the compressor 14. If an air flow rate detected by the flowmeter 72 is below a required value of the fuel cell 2, then it is determined that the air filter 82 has become clogged by snow and the air cleaner 13 has frozen. In this case, therefore, the controller 7 should drive the heater 100 to eliminate the freeze in the case 81. On the other hand, if the air flow rate detected by the flowmeter 72 is the required value of the fuel cell 2, then the heater 100 is kept turned off.

A third method utilizes the comparison between a required driving force of the traction motor 64 and an actual driving force, although this is not illustrated. If a required driving force of the traction motor 64 is not reached, then it is considered that the air filter 82 has become clogged by freeze, as described in the second method, and an air flow rate corresponding to the required driving force is not being supplied to the fuel cell 2. In this case, therefore, the controller 7 should drive the heater 100 to eliminate the freeze in the case 81. On the other hand, if the required driving force of the traction motor 64 has been reached, then the heater 100 may be kept turned off.

Figure 3:
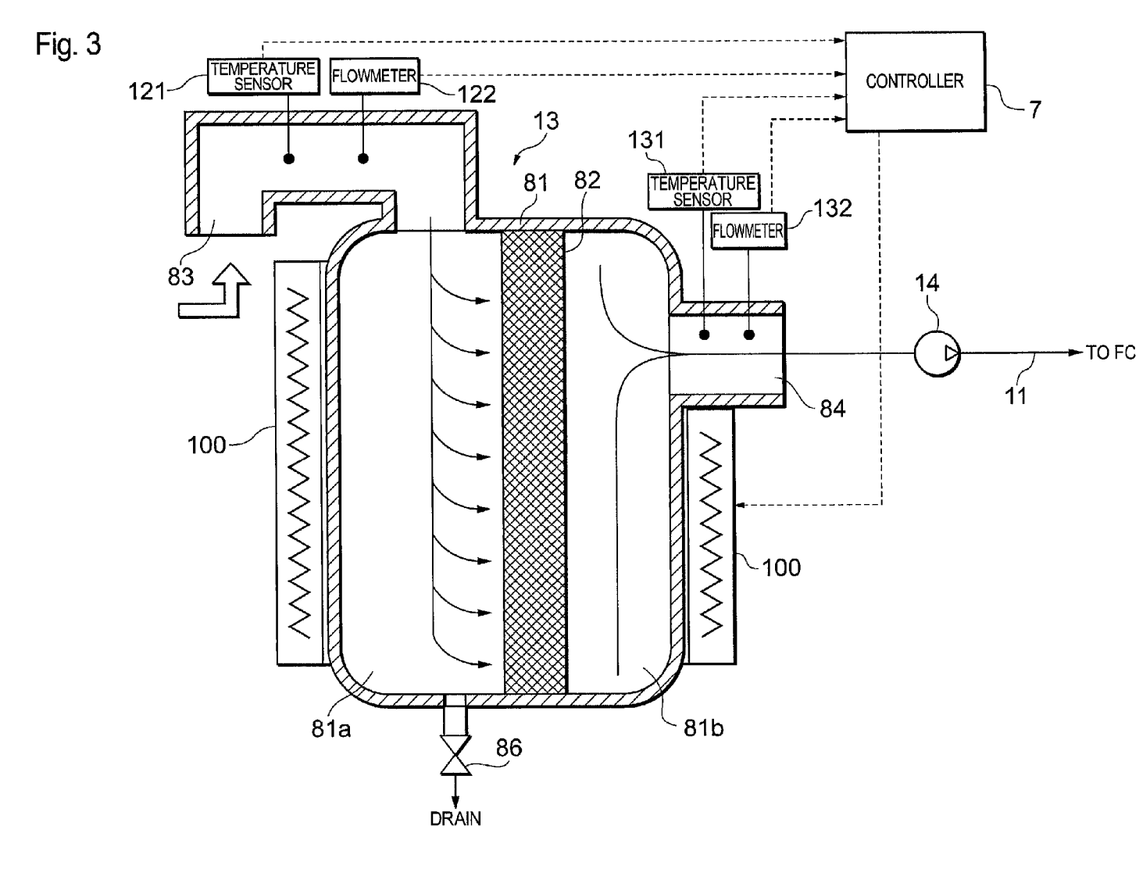
FIG. 3 is a schematic sectional diagram illustrating an air cleaner and a heater according to a modification example of the first embodiment.

A fourth method utilizes detection results of various state amounts related to the air cleaner 13. As illustrated in FIG. 3, a temperature sensor 121 and a flowmeter 122 are provided on the side of the air inlet 83, and a temperature sensor 131 and a flowmeter 132 are provided on the side of the air outlet 84, these being electrically connected to the controller 7. The temperature sensor 121 and the flowmeter 122 measure the intake temperature and the intake amount, respectively, of external air to be taken into the case 81. Similarly, the temperature sensor 131 and the flowmeter 132 measure the pressure-feed temperature and the pressure-feed amount, respectively, of external air which is pressure-fed to the outside of the case 81.

When the heater 100 is not being driven, the intake temperature and the pressure-feed temperature measured by the temperature sensors 121 and 131 are virtually the same as an external air temperature. Hence, in place of the external air temperature sensor 71, the temperature sensor 121 or 131 may be used to control the heater 100 in the same manner as that in the first method. If the heater 100 is driven, then the determination of whether there is the possibility of freeze in the case 81 is continued by the temperature sensor 121, and a temperature rise in the case 81 is grasped by the temperature sensor 131 so as to determine the heating amount of the heater 100.

If the intake air amount and the pressure-feed amount measured by the flowmeters 122 and 132 are below a required value of the fuel cell 2, then it is considered that the air filter 82 has become clogged by freeze, as described in the second method. In this case, therefore, the controller 7 should drive the heater 100 to eliminate the freeze in the case 81. If the heater 100 is driven, then the degree of elimination of the freeze should be grasped by the flowmeter 132 so as to determine the heating amount of the heater 100.

Incidentally, when the heater 100 is controlled by the fourth method, all of the intake temperature, the intake amount, the pressure-feed temperature, and the pressure-feed amount may be detected; alternatively, however, one of them may be detected. Further, it is needless to say that the first to the fourth methods may be used in a combination.

As described above, according to the present embodiment, the freeze of the air cleaner 13 can be restrained by the heater 100. Hence, even in a low-temperature environment or the like, a desired air flow rate can be secured for the fuel cell 2. In other words, air of a flow rate required for an output of the fuel cell 2 can be supplied to the fuel cell 2, thus making it possible to satisfy a required driving force of the traction motor 64. Further, the snow melted by the heater 100 accumulates in the form of a liquid at the bottom of the case 81, but the melted snow can be drained to the outside through a drain valve 86 provided at the bottom thereof. This allows the freeze at the bottom of the case 81 to be also restrained.

The drive of the heater 100 may be started immediately after a startup of the vehicle 90; however, an output is not required of the fuel cell 2 much immediately after the startup, so that the heater 100 may be driven only while the vehicle 90 is traveling, during which an output is required.

Second Embodiment

Figure 4:
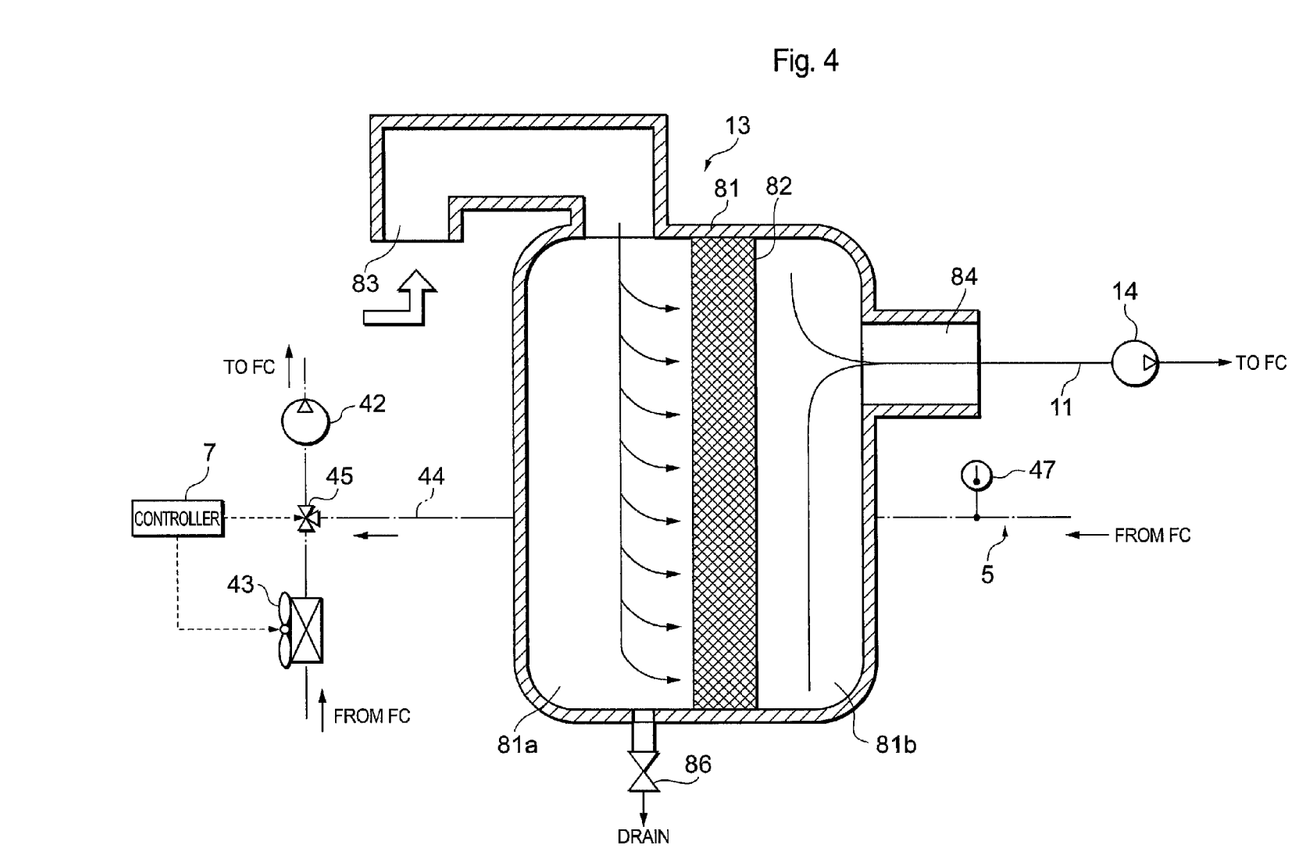
FIG. 4 is a schematic sectional diagram illustrating an air cleaner and a cooling circuit according to a second embodiment.
Figure 5:
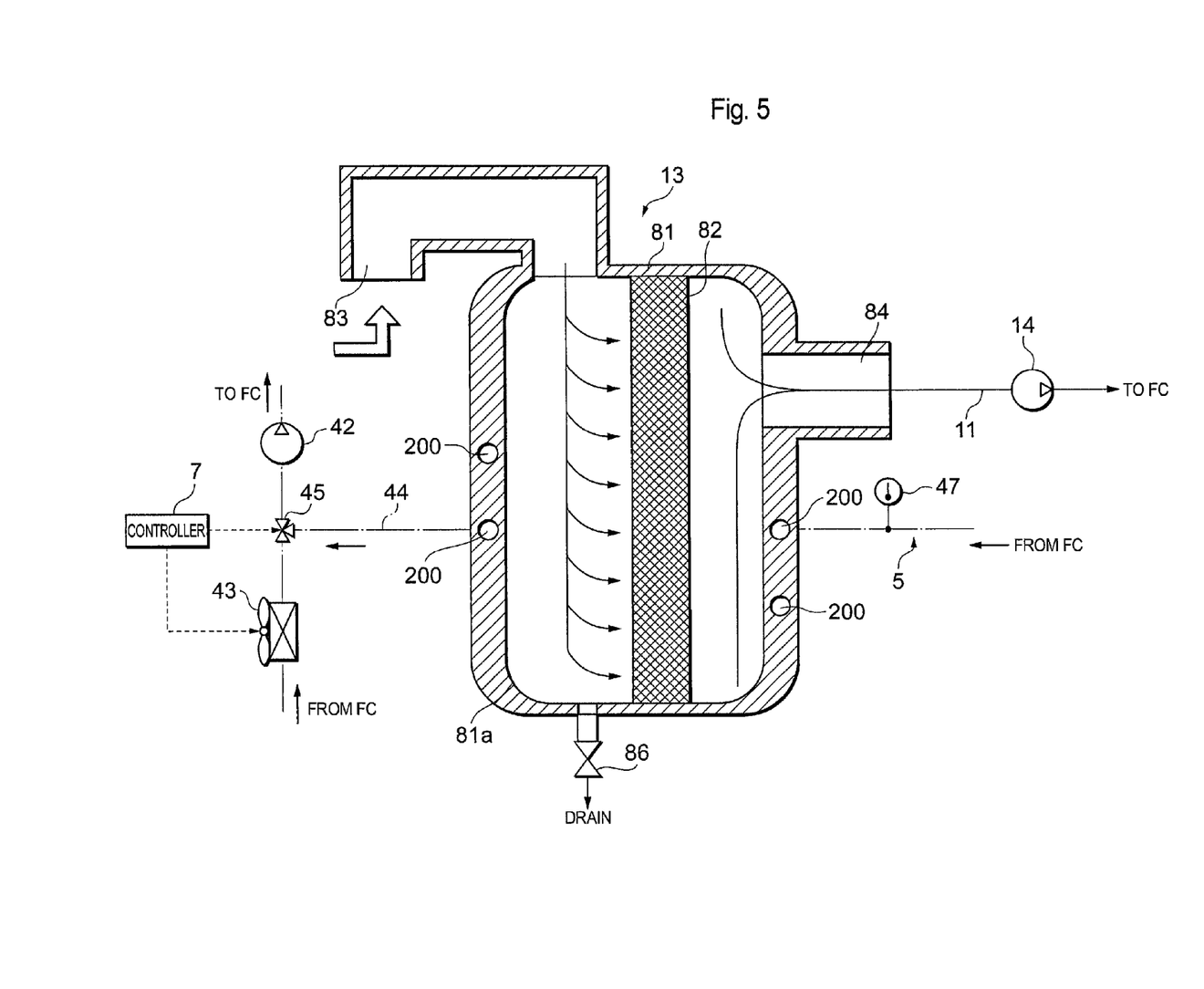
FIG. 5 is a schematic sectional diagram illustrating an air cleaner and a cooling circuit according to a first construction example of the second embodiment.
Figure 6:
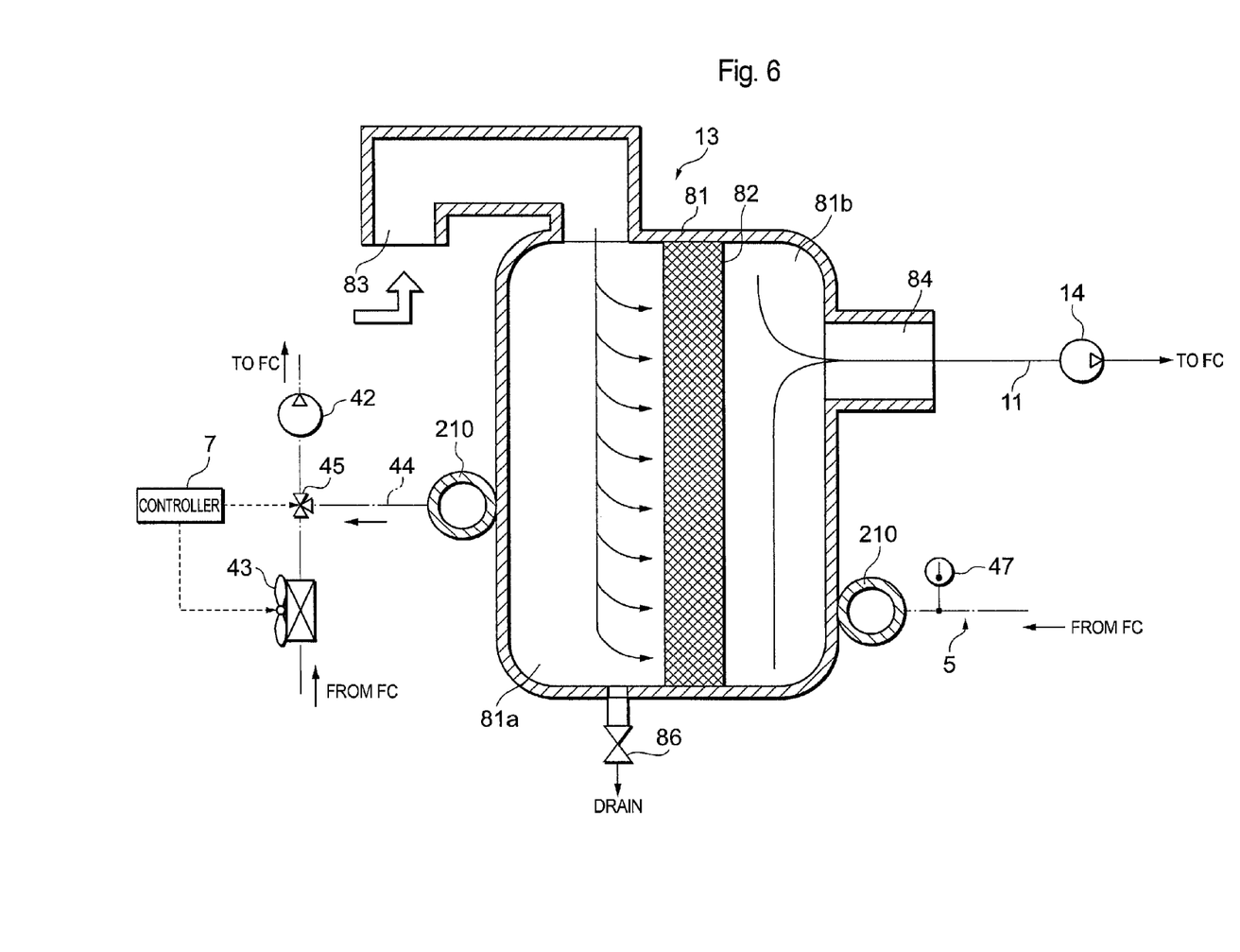
FIG. 6 is a schematic sectional diagram illustrating an air cleaner and a cooling circuit according to a second construction example of the second embodiment.

Referring now to FIGS. 4 through 6, the fuel cell system 1 according to a second embodiment will be explained regarding main different aspects. An aspect different from the first embodiment is that a refrigerant piping system 5 is used in place of the heater 100 as the heating means for heating the air cleaner 13. The remaining aspects are the same, so that like reference numerals will be assigned and the detailed explanation thereof will be omitted.

As illustrated in FIG. 4, a part of the refrigerant piping system 5 is constructed so as to supply the refrigerant which has passed through the fuel cell 2 to the air cleaner 13, thus constituting a heating means. In one example, a part of the refrigerant piping system 5 constituting the heating means is mainly the bypass flow path 44. The temperature of the refrigerant in the bypass flow path 44 has been risen to a predetermined temperature (the temperature of the fuel cell 2) by an electric power generation reaction of the fuel cell 2, so that the refrigerant can be used to heat the air cleaner 13.

It is needless to say that the use is not limited to the bypass flow path 44; however, the refrigerant used for heating the air cleaner 13 is preferably a refrigerant which has been discharged from the fuel cell 2 and which has not been cooled by the radiator 43. Further, the refrigerant used for heating the air cleaner 13 may alternatively be one that runs in a branched flow path which branches off the bypass flow path 44 and merges to the refrigerant flow path 41.

Two constructions, for example, can be considered for the refrigerant piping system 5, which heats the air cleaner 13.

A first construction is that a refrigerant flow path 200, which configures the part of the bypass flow path 44, is formed in a case 81 itself, as illustrated in FIG. 5. In this case, the pipe of the refrigerant flow path 200 is desirably embedded in the peripheral wall of the case 81 such that the case 81 can be heated from the peripheral direction. For instance, the pipe of the refrigerant flow path 200 may be spirally embedded in the case 81 so as to extensively heat the case 81. Further preferably, however, the pipe of the refrigerant flow path 200 is provided near the air filter 82.

A second construction is that the outer peripheral surface of a pipe 210, which configures the part of the bypass flow path 44, is provided in contact with an outer surface of the case 81, as illustrated in FIG. 6. In this case also, the pipe 210 is preferably in contact with the case 81 over a large area and in spiral contact with the outer surface of the case 81 near the air filter 82.

According to the present embodiment, the air cleaner 13 can be heated by the refrigerant running in the refrigerant flow path 200 or the pipe 210. Hence, it is possible to restrain the freeze at the air cleaner 13 and satisfy a required driving force of the traction motor 64, as with the first embodiment, without the need for providing a separate heat source, such as the heater 100 in the first embodiment.

Although not described in detail, in the present embodiment also, it should be determined whether there is a possibility of the freeze or there is a freeze on the air cleaner 13 and then determined whether the air cleaner 13 should be heated according to the first to the fourth methods described in the first embodiment. The heating amount of the air cleaner 13 should be controlled by controlling, by means of the controller 7, the set position in the switching valve 45 or the amount of cooling by the radiator 43 (e.g., the revolution speed of a fan provided in the radiator 43).

In another embodiment, a refrigerant which has passed through constituent equipment other than the fuel cell 2 is led to the air cleaner 13 to heat the air cleaner 13. For instance, a refrigerant which has passed equipment, such as the pump 24 or the like, or a refrigerant which has passed through one of the equipment of the electric power system 6, e.g., the high-voltage DC/DC converter 61, the traction inverter 63, and the auxiliary equipment inverters 65, 66 and 67, may be led to the air cleaner 13.

INDUSTRIAL APPLICABILITY

The fuel cell system 1 in accordance with the present invention can be installed in a train, an airplane, a marine vessel, a robot, or other mobile body, besides a two-wheeled or four-wheeled motor vehicle. Moreover, the fuel cell system 1 can be used as a fixed type and incorporated in a cogeneration system.

The invention claimed is:
1. A fuel cell system including a fuel cell and an air cleaner for cleaning air to be supplied to the fuel cell, comprising:
   a compressor which takes air in through the air cleaner and pressure-feeds the air to the fuel cell;
   a flowmeter for measuring the pressure-feed amount of air to the fuel cell;
   a heating device for heating the air cleaner; and
   a controller which determines whether the air cleaner may freeze or has frozen, the controller being programmed to control the heating device to heat the air cleaner in a case where the controller determines that the air cleaner may freeze or has frozen,
   wherein the air cleaner includes a case having an air inlet and an air outlet,
   wherein the flowmeter measures the pressure-feed amount of air which is pressure-fed to outside of the case and the flowmeter being provided on an upstream side of the compressor;
   wherein the controller is programmed to control the amount of heating of the air cleaner by the heating device based on at least one of an external air temperature, the intake amount of air into the case, and the pressure-feed amount of air decreases,
   wherein when the air cleaner is heated, the controller is further programmed to determine whether there is a possibility of freeze in the case based on the intake temperature and to grasp the degree of elimination of the freeze by the flowmeter, and
   wherein the controller is further programmed to determine the amount of the heating needed by the heating device based on the grasped degree of elimination of the freeze by the flowmeter.

2. The fuel cell system according to claim 1, wherein the heating device is constructed of a heater provided with the air cleaner.

3. The fuel cell system according to claim 2, wherein the air cleaner comprises a filter disposed in the case between the air inlet and the air outlet, and the heater is provided on an outer surface side of the case.

4. The fuel cell system according to claim 1, further comprising a cooling system which circulates a refrigerant to constituent equipment of the fuel cell system,
wherein the heating device is constructed of a part of the cooling system which supplies a refrigerant which has passed through the constituent equipment to the air cleaner.

5. The fuel cell system according to claim 4, wherein the constituent equipment is the fuel cell.

6. The fuel cell system according to claim 4, wherein the air cleaner comprises a filter disposed in the case between the air inlet and the air outlet, and
a flow path, which configures a part of the cooling system constituting the heating device, is formed in the case.

7. The fuel cell system according to claim 4, wherein the air cleaner comprises a filter disposed in the case between the air inlet and the air outlet, and
a pipe, which configures a part of the cooling system constituting the heating device, is in contact with the case.

8. The fuel cell system according to claim 4, wherein the cooling system has a radiator and a bypass flow path which bypasses the radiator; and the part of the cooling system is the bypass flow path.

9. The fuel cell system according to claim 1, wherein the controller is programmed to control the heating device such that the air cleaner is not heated in the case where the controller determines that there is no possibility of the air cleaner being frozen or that the air cleaner did not freeze.

10. A mobile body comprising a fuel cell system according to claim 1.

* * * * *